(12) United States Patent
Lee et al.

(10) Patent No.: US 8,350,997 B2
(45) Date of Patent: Jan. 8, 2013

(54) LIQUID CRYSTAL DISPLAY DEVICE

(75) Inventors: Mi-Kyung Lee, Uijeongbu Si (KR); Ji-Yun Jang, Daegu (KR)

(73) Assignee: LG Display Co., Ltd., Seoul (KR)

( * ) Notice: Subject to any disclaimer, the term of this patent is extended or adjusted under 35 U.S.C. 154(b) by 162 days.

(21) Appl. No.: 12/314,697

(22) Filed: Dec. 15, 2008

(65) Prior Publication Data

US 2009/0303421 A1    Dec. 10, 2009

(30) Foreign Application Priority Data

Jun. 10, 2008   (KR) .................. 10-2008-0054322

(51) Int. Cl.
*G02F 1/1335* (2006.01)
(52) U.S. Cl. .............. 349/117; 349/96; 349/97; 349/98
(58) Field of Classification Search .............. 349/96–98, 349/117
See application file for complete search history.

(56) References Cited

U.S. PATENT DOCUMENTS

| 2006/0033994 A1* | 2/2006 | Li et al. ............... 359/494 |
| 2006/0262255 A1* | 11/2006 | Wang et al. ............ 349/114 |
| 2008/0273146 A1* | 11/2008 | Ohtani et al. ........... 349/96 |

FOREIGN PATENT DOCUMENTS

CN          1409135         4/2003

* cited by examiner

*Primary Examiner* — Phu Vu
(74) *Attorney, Agent, or Firm* — McKenna Long & Aldridge LLP

(57) ABSTRACT

A Liquid Crystal Display (LCD) device includes: a panel on which images are implemented; a backlight device below the panel and providing light; and a polarizer including a linear-polarizing layer over the panel that linear-polarizes light from the backlight device and a circular-polarizing layer over the linear-polarizing layer that circular-polarizes the linear-polarized light.

9 Claims, 3 Drawing Sheets

LIQUID CRYSTAL DISPLAY DEVICE

This application claims the benefit of Korean Application No. 10-2008-0054322, filed on Jun. 10, 2008, which is hereby incorporated by reference for all purposes as if fully set forth herein.

BACKGROUND OF THE INVENTION

1. Field of the Invention

The present invention relates to a liquid crystal display device, and particularly, to a liquid crystal display device which is capable of improving a phenomenon that a user wearing (polarized) sunglasses cannot view images when using, for example, a vehicle-loaded display or a mobile phone.

2. Discussion of the Related Art

In general, a liquid crystal display (LCD) device is driven using an optical anisotropy of a liquid crystal and a polarizing characteristic thereof. Here, since the liquid crystal is configured to be long and thin, molecules thereof are arranged with a direction. And, the direction of the modules can be controlled by additionally applying an electric field to the liquid crystal.

Thus, if the arrangement of the molecules of the liquid crystal is changed by additionally adjusting a size of the electric field applied to the liquid crystal, a polarizing characteristic of an incident light having passed through a liquid crystal layer is changed. And accordingly, the amount of light passing through a polarizer is adjusted thus to express image information.

Currently, an Active Matrix LCD (AM-LCD) in which Thin Film Transistors (TFTs) and pixel electrodes connected thereto are arranged in a matrix form is mostly focused on because it has excellent resolution and capability for implementing a moving picture.

FIG. 1 is an exploded perspective view showing a related art LCD device.

As shown in FIG. 1, an LCD device 60 includes a backlight device 50 for generating light and a display device 40 disposed at an upper side of the backlight device 50 so as to displaying images by receiving light from the backlight device 50.

The backlight device 50 includes a lamp device 51 including a lamp 51a generating light and a lamp housing 51b for protecting the lamp 51 a from an external impact, a light guide plate 52 for guiding the light from the lamp device 51 to a liquid crystal panel 10, a reflection plate 54 for reflecting light upwardly by being disposed at a lower side of the light guide plate 52, and an optical sheet 53 composed of a diffusion sheet 53a for changing a characteristic of the light having passed through the light guide plate, a prism sheet 53b and a protection sheet 53c.

The display device 40 includes the liquid crystal panel 10 and upper and lower polarizers 20, 30 respectively provided above and below the liquid crystal panel 10. The liquid crystal panel 10 includes a TFT substrate 11 on which electrodes are formed, a color filter substrate 12 and a liquid crystal layer interposed between the upper and lower polarizers 20, 30. Here, the upper and lower polarizers 20, 30 are provided with an adhesive layer 21 for adhering to the liquid crystal panel 10.

The polarizers 20, 30 are attached onto upper and lower surfaces of the liquid crystal panel 10, accordingly light emitted from the backlight device 50 is made to be incident on the liquid crystal panel 10 through the linear polarizer 20.

LCD devices, such those in a vehicle-loaded display or a mobile phone, are frequently exposed to external environment. Here, a person may watch a screen while wearing polarized sunglasses. In the case of polarized sunglasses, light reflected from sunlight is made to be incident into eyes of users in a horizontal direction. The polarized sunglasses reduce the horizontal light, thereby reducing eye fatigue.

However, in case of the vehicle-loaded display such as a navigation or the mobile phone, for example, an angle not allowing an image to be viewed exists according to an angle between the upper polarizer of the liquid crystal panel and an absorption axis of the polarized sunglasses. Accordingly the image cannot be viewed at this angle. In this case, the user may repeatedly put on and take off the polarized sunglasses, which causes the user to feel annoyed.

SUMMARY OF THE INVENTION

Accordingly, the present invention is directed to a liquid crystal display device that substantially obviates one or more of the problems due to limitations and disadvantages of the related art.

An advantage of the present invention is to provide a Liquid Crystal Display (LCD) device which is capable of implementing images in a circular-polarizing manner from a linear-polarizing manner by changing a structure of a polarizer attached onto an upper side surface of a liquid crystal panel on which images are implemented.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described a Liquid Crystal Display (LCD) device includes: a panel on which images are implemented; a backlight device below the panel and providing light; and a polarizer comprising a linear-polarizing layer over the panel that linear-polarizes light from the backlight device and a circular-polarizing layer over the linear-polarizing layer that circular-polarizes the linear-polarized light.

In another aspect of the present invention, a method of manufacturing a Liquid Crystal Display (LCD) device includes: providing a panel on which images are implemented; providing a backlight device below the panel and providing light; and forming a polarizer comprising a linear-polarizing layer disposed over the panel that linear-polarizes light from the backlight device and a circular-polarizing layer disposed over the linear-polarizing layer that circular-polarizes the linear-polarized light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which is illustrated in the accompanying drawings.

Figure 1:
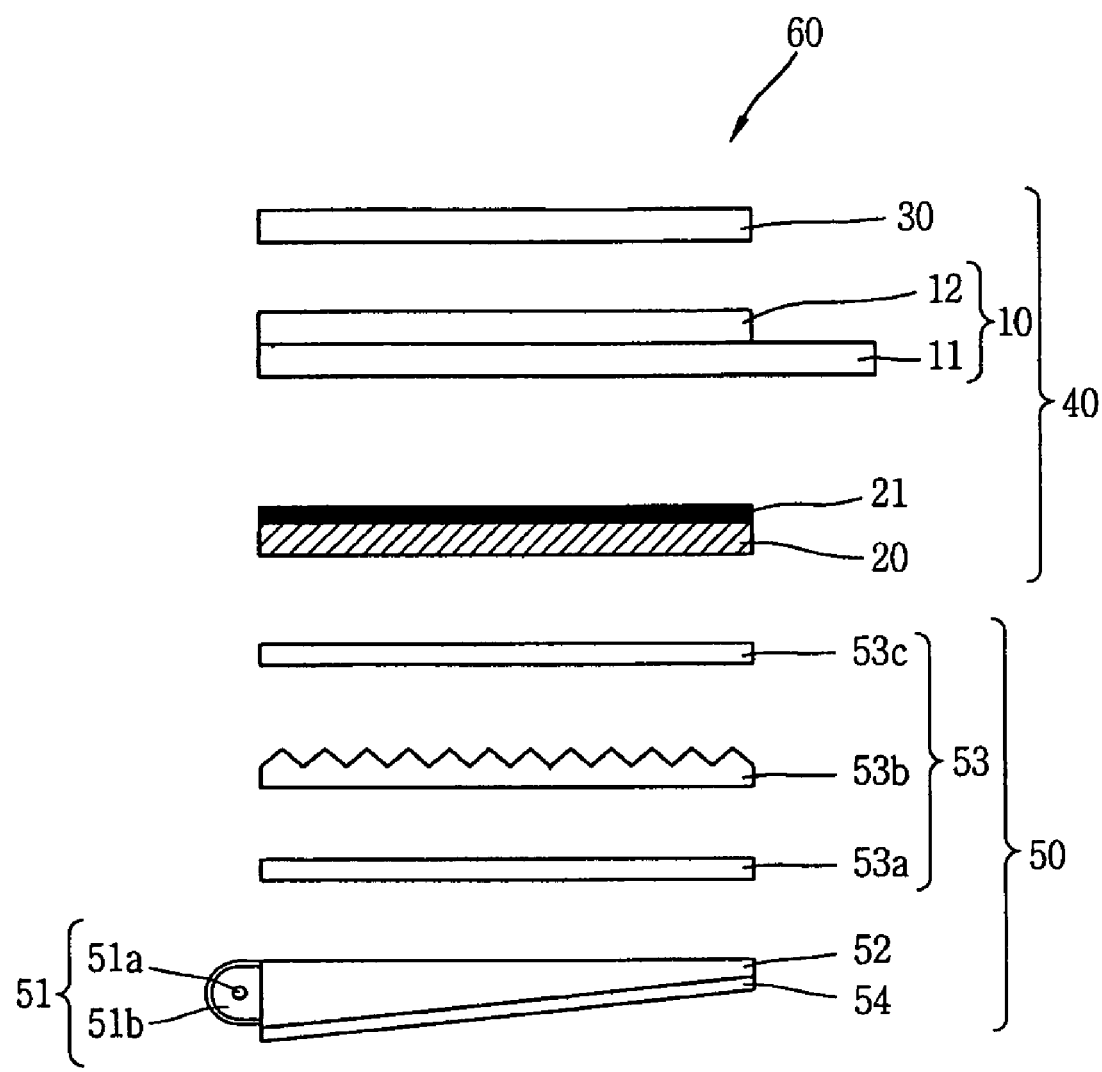
FIG. 1 is an exploded perspective view showing a related art LCD device.
Figure 2:
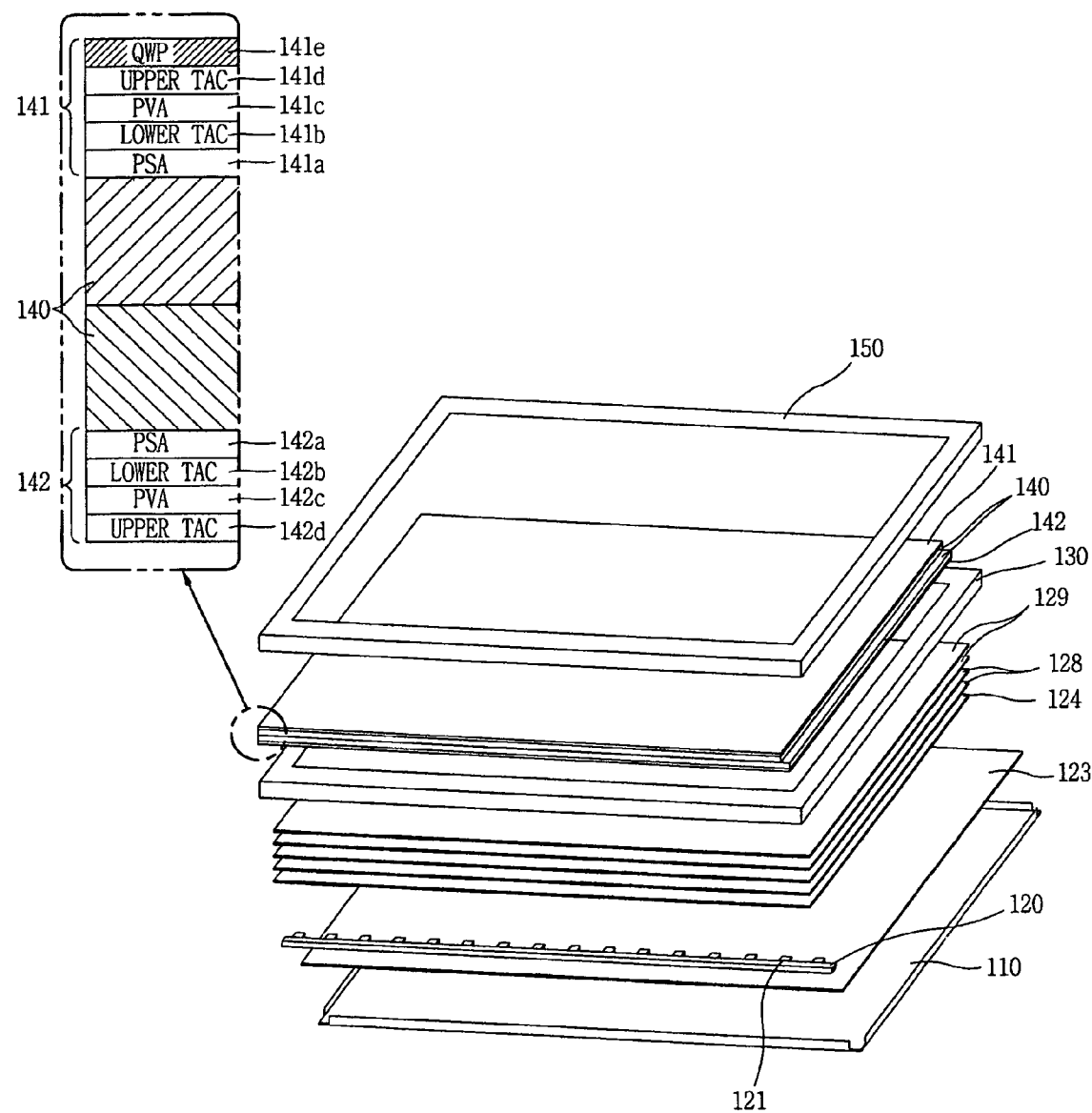
FIG. 2 is an exploded perspective view showing an LCD device in accordance with a first exemplary embodiment of the present invention.

FIG. 2 is an exploded perspective view showing an LCD device in accordance with a first exemplary embodiment of the present invention.

As shown in FIG. 2, an LCD device includes a lower cover 110, a backlight device disposed on the lower cover 110 so as to supply light and a liquid crystal panel 140 disposed above the backlight device so as to implement images. And, an upper polarizer 141 including a linear-polarizing layer 141c, such as a Poly-Vinyl-Alcohol (PVA) layer 141c, for linear-polarizing light provided from the backlight device and a circular-polarizing layer 141e, such as a Quarter Wave Plate (QWP) 141e, for circular-polarizing the light having linear-polarized through the PVA layer 141c is provided over the liquid crystal layer 140.

Here, the lower cover 110 includes a lower frame forming a bottom surface and a side frame vertically (or inclinedly) extended from at least one edge portion of the lower frame. The lower cover may be formed of aluminium (Al) or Electrolytic Galvanized Iron (EGI).

And, a reflection plate 123 for reflecting light emitted from a light emitting device 121, e.g., LED, to the front liquid crystal panel 140 is disposed over the lower cover 110. And, a PCB 120, such as a metal PCB, on which the LEDs are fixedly arranged with a substantially constant gap therebetween and a light guide plate 124 are sequentially stacked over the reflection plate 123.

Here, the reflection plate 123 serves to reflect light from a lamp disposed on a side surface thereof, i.e., the light emitting device 121, to the liquid crystal panel 140 disposed above the reflection plate 123 or at a front side thereof without loss. The reflection plate 123 may be implemented as a film coated with argentum (Ag), aluminium (Al), etc. A thickness of the film may be approximately 75~200 μm. A light reflectance at the reflection plate 123 may be approximately 90~97%. The thicker the coated film is, the greater the reflectance is.

And, the metal PCB 120 is attached onto an inside of a portion upwardly bent from one edge of the lower cover 110. Here, since a voltage is applied to anode (+) and cathode (−) electrodes on the metal PCB 120 from external power unit so as to drive the LEDs on the PCB 120 through a hole at one edge of the bottom surface of the lower cover 110, for example, an additional molding pattern is attached onto a peripheral portion of the anode and cathode electrodes so that the electrodes can be insulated from the conductive lower cover 110.

Since the LEDs are attached onto the side surface of the lower cover 110 and the light emitting portion faces the light guide plate 124, the emitted light is introduced into the light guide plate 124. Here, the light guide plate 124 may be formed of Polymethylmethacrylate (PMMA). The light guide plate 124 serves as a transparent plate for uniformly distributing light onto an entire screen of the liquid crystal panel 140 by allowing light to pass therethrough from the light emitting device disposed at the side surface thereof. The light from the light emitting device 121 is made to be incident onto the light guide plate 124 and then passes through the light guide plate 124. Then, the light is reflected by the reflection plate 123 disposed under the light guide plate 124 and then uniformly emitted in a direction perpendicular to the reflection plate 123.

And, optical sheets 128, 129 are stacked over the metal PCB 120 attached onto the lower cover 110 and the light guide plate 124. There may be two diffusion sheets 128 and two protection sheets 129 for irradiating light to the liquid crystal panel 140 by enhancing efficiency of the light emitted from the reflection plate 123 and the light guide plate 124.

A panel guide 130 is coupled to an outer side of the lower cover 110 as a frame molding pattern for maintaining entire balance of the LCD device and spacing the liquid crystal panel 140 from the lower cover 110 with a specific gap therebetween.

And, the liquid crystal panel 140 for implementing images are stacked on the panel guide 130. The liquid crystal panel 140 is composed of a TFT array substrate and a color filter substrate facing and attached to each other with a constant cell gap therebetween and a liquid crystal layer interposed therebetween.

Meanwhile, upper and lower polarizers 141, 142 are respectively provided over and under the liquid crystal panel 140. The upper polarizer 141 includes a QWP 141e circular-polarizing light from the backlight device, the light having linear-polarized through a PVA layer 141c disposed below the QWP 141e.

Additionally, the upper polarizer 141 disposed over the liquid crystal panel 140 may be provided with an upper Tri-Acetyl-Cellulose (TAC) 141d and a lower TAC 141b for protecting the PVA layer 141c by being disposed over and under the PVA layer 141c for linear-polarizing light having transmitted the liquid crystal panel 140. Also, an adhesion layer (PSA) 141a adhered to the color filter substrate is formed under the lower TAC 141b. And, the QWP 141e for circular-polarizing the light having been linear-polarized after transmitting the PVA layer 141c is formed over the upper TAC 141d. That is, the upper polarizer 141 is sequentially composed of the adhesion layer 141a, the lower TAC 141b, the PVA 141c, the upper TAC 141d and the QWP 141e on the basis of an adhesion surface coming in contact with the color filter substrate.

And, an upper cover 150 formed in a rectangular frame shape and covering edge portions of the liquid crystal panel 140 is coupled to the panel guide 130.

The light provided from the backlight device is emitted in a circular-polarized state when images are implemented on the liquid crystal panel 140 of the LCD device.

As a result, the circular-polarized light enables the user wearing polarized sunglasses to view a screen displayed on the liquid crystal panel 140 when the user watches a vehicle-loaded display or views a liquid crystal screen of a mobile phone.

That is, the light linear-polarized through the PVA layer 141c after transmitting the liquid crystal panel 140 has an angle blocked according to an absorption axis of the polarized sunglasses. Here, the absorption axis of the sunglasses has an angle of 0 degree. Thus, the light transmitted with being linear-polarized by 0 degree is blocked.

When the QWP 141e is applied over the PVA layer 141c, the linear-polarized light is changed into the circular-polarized light. Thus, the user wearing the polarized sunglasses can recognize the images regardless of the angle blocked by the polarized sunglasses.

In other words, since the circular-polarized light, that is, light transmitted in a direction of a circular trace is emitted, light excluding light corresponding to an absorption axis of the polarized sunglasses is absorbed. Accordingly, the user can recognize the images.

A method for fabricating the upper polarizer 141 according to an embodiment of the present invention is as follows. First, a dichroic pigment is arranged to be absorbed into a Polyvinyl-Alcohol that is a high molecular substance so that the PVA layer 141c forming a polarizer is configured.

And, transparent supporting layers formed at the upper and lower sides of the PVA layer 141c, that is, upper and lower TAC 141b, 141d formed of Tri-Acetyl-Cellulose (TAC) may be formed in one manner of a top-down manner, a down-top manner and a horizontally-laminated (or combined) manner.

Also, the lower TAC 141b is configured to have an adhesive layer 141a or an adhesive agent so as to be attached on the liquid crystal panel 140, that is, the color filter substrate and the TFT array substrate.

Moreover, the QWP 141e formed of a poly-based resin forming the upper TAC 141d is also formed in one manner of the top-down manner, the down-top manner and the horizontally-laminated manner. A phase value is adjusted by adjusting a reflective index and a thickness thereof. Accordingly, the QWP 141e may generate a phase delay difference of $\lambda/4$ with respect to light linear-polarized by passing through the PVA layer 141c, thereby implementing circular-polarized light.

However, in case that the QWP 141e of the upper polarizer 141 is outwardly exposed according to the first embodiment of the present invention, since the QWP 141e is vulnerable to external pressure and thus has a weak surface hardness, it may be easily scratched. Accordingly, it may degrade reliability when it is fabricated into a product.

Also, in case that a surface treatment or interface treatment, such as a hard coating or a low reflective treatment, is not executed on the QWP 141e, if the LCD device is in a high illuminance environment such as an external solar light or an interior lighting lamp, the maximum reflexibility reflected through the polarizer 141 may reach 4%. Accordingly, the contrast ratio may decrease by a surface reflection or an outdoor visibility may be greatly reduced by a color fadedness.

Accordingly, proposed is an LCD device in accordance with a second exemplary embodiment of the present invention.

Figure 3:
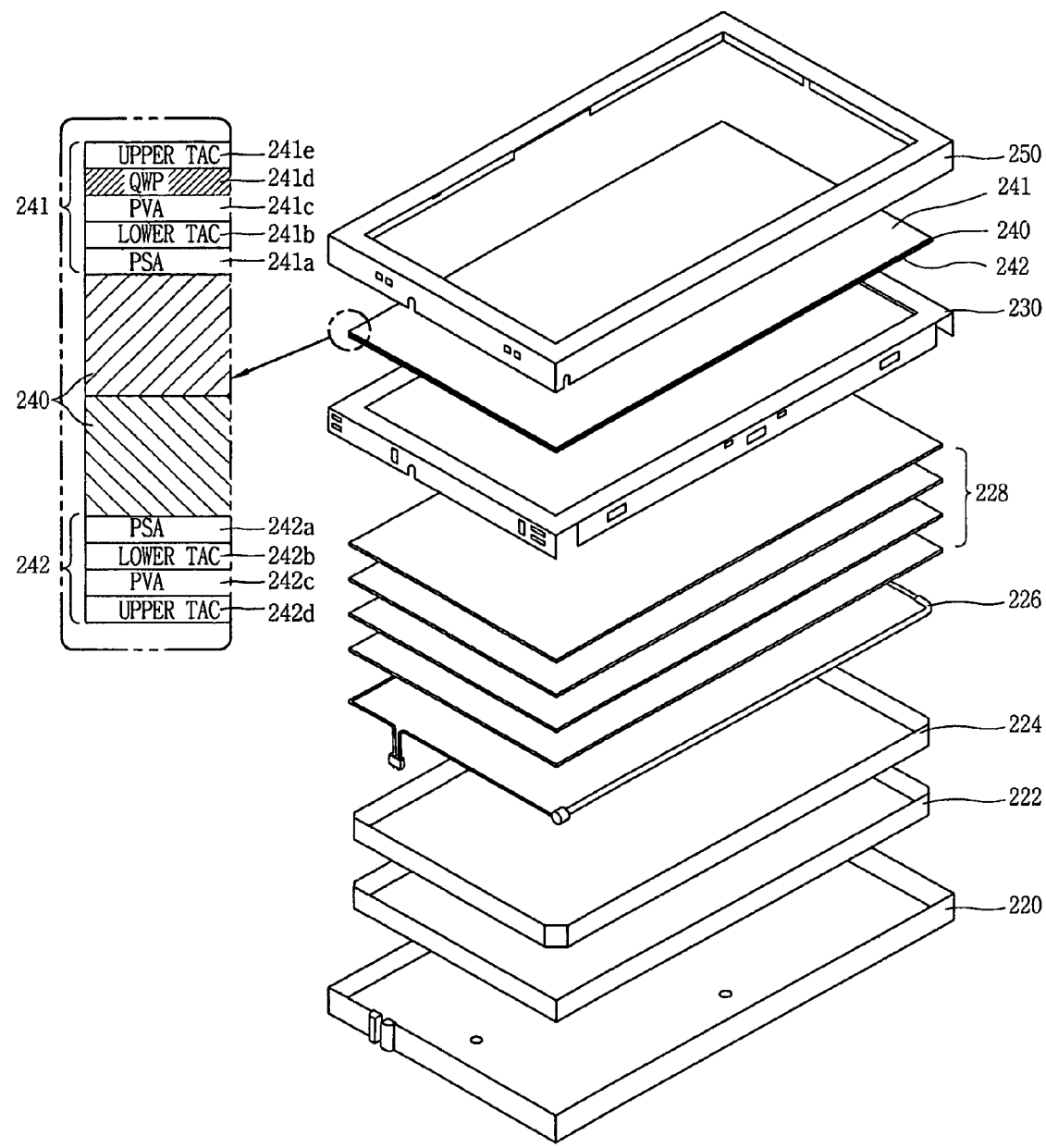
FIG. 3 is an exploded perspective view showing an LCD device in accordance with a second exemplary embodiment of the present invention.

FIG. 3 is an exploded perspective view showing an LCD device in accordance with the second embodiment of the present invention.

As shown in FIG. 3, a lower cover 220 is configured to have a bottom surface and side surfaces. And, a side surface and the bottom surface of at least one side edge portion of the side surfaces is configured to be partially open. And, a reflection plate 222 is attached onto the lower cover 220 so as to frontwardly reflect light.

Here, the reflection plate 222 serves to reflect light emitted from a light emitting device disposed at the side surface, that is, a lamp 226, to a liquid crystal panel 240 disposed over or the front side thereof without loss. The reflection plate 222 is formed of a film coated with Ag or Al, in many cases. The film has a thickness of approximately 75~200 μm. A light reflexibility of visible light on the reflection plate 222 is approximately 90~97%. And, the thicker the coated film is, the higher the reflexibility is.

And, the lamp 226 is coupled to one side edge of the lower cover 220. A light guide plate 224 for inducing light from the lamp 226 is stacked over the lower cover 220 with being spaced from the lamp 226. By this configuration, the light guide plate 224 efficiently induces light from the lamp 226 and provides it to the liquid crystal panel 240.

Here, a voltage is applied to the lamp 226 through an inverter (not shown) coupled to a rear surface of the lower cover 220 through a low-voltage and a high-voltage wires. The wires are included through a hole formed at least one side surface. In such state, the wires may also be fixed at an opened portion formed at one side edge portion of the lower cover 220 using a wire holder.

And, the light guide plate 224 is stacked over the lower cover 220 and optical sheets 228 are stacked thereon. In general, the optical sheet 228 may be configured with two diffusion sheets (not shown) and two protection sheets (not shown) serving to enhance efficiency of light emitted from the reflection plate 222 and the light guide plate 224 and then irradiate to the liquid crystal panel 240.

The light guide plate 224 is a transparent plate formed of PMMA so as to uniformly distribute light to the entire screen of the liquid crystal panel 240 by passing through the light from the lamp 226 disposed at the side surface. The light emitted from the lamp 226 is incident onto the light guide plate 224 and then induced by the light guide plate 224. Thereafter, the light is reflected onto the reflection plate 222 disposed below the light guide plate 224 and then uniformly emitted in the vertical direction.

A panel guide 230 formed of a frame molding material is configured to have a constant pattern thereon, and accordingly the liquid crystal panel 240 is stacked thereon. And the panel guide 230 has side surfaces provided with specific coupling means so as to be coupled to the outside of the lower cover 220. Here, the panel guide 230 serves to maintain overall balance of the LCD device.

And, the liquid crystal panel 240 for implementing images is stacked on the panel guide 230. The liquid crystal panel 240 is composed of a TFT array substrate and a color filter substrate TFT array substrate and a color filter substrate facing and attached to each other with a constant cell gap therebetween and a liquid crystal layer interposed therebetween.

Meanwhile, upper and lower polarizers 241, 242 are respectively provided over and under the liquid crystal panel 240. The upper polarizer 241 includes a QWP 241d circular-polarizing light from the backlight device, the light having linear-polarized through a PVA layer 241c disposed below the QWP 241d.

In other words, the upper polarizer 241 disposed over the liquid crystal panel 240 includes the QWP 241d formed on the PVA layer 241c on the basis of the PVA layer 241c linear-polarizing light having transmitted the liquid crystal panel 240 and serving to circular-polarize light having been linear-polarized by having transmitted the PVA layer 241c, an upper TAC 241e formed on the QWP 241d, a lower TAC 241b formed under the PVA layer 241c and an adhesion layer 241a formed under the lower TAC 241b and adhered to the color filter substrate. That is, the upper polarizer 241 is sequentially composed of the adhesion layer 241a, the lower TAC 241b, the PVA 241c, the QWP 241d and the upper TAC 241e on the basis of an adhesion surface coming in contact with the color filter substrate.

Meanwhile, a lower polarizer 242 disposed under the liquid crystal panel 240 includes an upper TAC 242d and a lower TAC 242b respectively formed over and under a PVA layer 242c so as to protect the PVA layer 242c, on the basis of the PVA layer 242c linear-polarizing light emitted from the backlight device, and an adhesion layer 242a formed under the lower TAC 242b so as to be adhered to the TFT array substrate. Thus, the lower polarizer 242 of the liquid crystal panel 240 is stacked in a sequence of the adhesion layer 242a, the lower TAC 242b, the PAV 242c and the upper 242d when supposing a surface adhered to the TFT array substrate as a start position.

And, an upper cover 250 formed in a rectangular frame shape and covering edges of the liquid crystal panel 240 is coupled to the panel guide 230.

With such configuration, when images are implemented on the liquid crystal panel 240 of the LCD device, the light emitted from the backlight device disposed at the lower portion thereof is circular-polarized.

As a result, the circular-polarized light allows users to view a screen displayed on the liquid crystal panel 240 when watching vehicle-loaded display or viewing a liquid crystal screen of a mobile phone wearing polarized sunglasses.

That is, the light linear-polarized through the PVA layer 242c after transmitting the liquid crystal panel 240 has an angle blocked with respect to an absorption axis of the polarized sunglasses. Here, the absorption axis of the sunglasses has an angle of 0 degree. Thus, the light transmitted with being linear-polarized by 0 degree is blocked.

In case that the QWP 241d is applied over the PVA layer 141c like the present invention, the linear-polarized light is changed into the circular-polarized light. Thus, the user wearing the polarized sunglasses can recognize the images regardless of the angle blocked by the polarized sunglasses.

In other words, since the circular-polarized light, that is, light transmitted in a direction of a circular trace is emitted, light excluding light corresponding to an absorption axis of the polarized sunglasses is absorbed. Accordingly, it is capable of recognizing the images.

Moreover, since the upper TAC 241e over the QWP 241d forming the upper polarizer 241 is formed of a non-aqueous phase transparent film or a glass, the upper TAC 241e can protect the QWP 241d from an external force. And, in order to decrease the reflexibility reflected through the polarizer 241 in the high illuminance environment, the interface treatment, such as the hard coating, the low reflective treatment, can be additionally executed on the upper TAC 241e. Accordingly, it is capable of increasing the contrast ratio. Also, as the light fadedness phenomenon is improved, it is capable of enhancing the outdoor visibility.

A method for fabricating the polarizer of the LCD device in accordance with the second embodiment of the present invention will be omitted since it can be alternated with the aforementioned method according to the first embodiment of the present invention. However, the processing sequence can be different from each other.

Furthermore, the present invention can be applied to any type of LCD devices whether it is a TN mode LCD device or an IPS mode LCD device.

Users can recognize images even when wearing polarized sunglasses using the principle that light having transmitted from the backlight device through the panel is primarily linear-polarized and then is circular-polarized. Thus, the PVA layer linear-polarizes light having transmitted the panel on the upper polarizer attached onto the panel and the QWP circular-polarizing the linear-polarized light. However, the layers can be disposed right on the substrate of the panel, instead of using the structure of the upper polarizer.

The LCD device enables users, including those enjoying leisure using a vehicle-loaded display or a mobile phone in an outdoor environment, to watch a screen while wearing polarized sunglasses. Accordingly it is capable of enhancing reliability of a product, which may increase demand on the LCD devices.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A Liquid Crystal Display (LCD) device comprising:
    a panel on which images are implemented;
    a backlight device below the panel and providing light; and
    a polarizer comprising a linear-polarizing layer over the panel that linear-polarizes light from the backlight device and a circular-polarizing layer over the linear-polarizing layer that circular-polarizes the linear-polarized light,
    wherein the polarizer is configured in sequence of an adhesion layer (PSA) adhered to the panel, a lower Tri-Acetyl-Cellulose (TAC) on the adhesion layer, a Poly-Vinyl-Alcohol (PVA) layer on the lower TAC, a Quarter Wave Plate (QWP) on the PVA layer and an upper TAC on the Quarter Wave Plate (QWP),
    wherein the upper TAC protects the Quarter Wave Plate (QWP) from an external force, and the upper TAC is applied by the interface treatment such as the hard coating or the low reflective treatment, to decrease the reflexibility reflected through the polarizer in the high illuminance environment so that the contrast ratio is increased, the light fadedness phenomenon is improved and the outdoor visibility is enhanced.

2. The LCD device of claim 1, wherein the linear-polarizing layer includes a Poly-Vinyl-Alcohol (PVA) layer.

3. The LCD device of claim 2, wherein the circular-polarizing layer includes a Quarter Wave Plate (QWP).

4. The LCD device of claim 1, wherein the upper TAC includes a low reflective layer.

5. A method of manufacturing a Liquid Crystal Display (LCD) device comprising:
    providing a panel on which images are implemented;
    providing a backlight device below the panel and providing light; and
    forming a polarizer comprising a linear-polarizing layer disposed over the panel that linear-polarizes light from the backlight device and a circular-polarizing layer disposed over the linear-polarizing layer that circular-polarizes the linear-polarized light,
    wherein forming the polarizer includes forming an adhesion layer (PSA) adhered to the panel, forming a lower Tri-Acetyl-Cellulose (TAC) on the adhesion layer, forming a Poly-Vinyl-Alcohol (PVA) layer on the lower TAC, forming a Quarter Wave Plate (QWP) on the PVA layer and forming an upper TAC on the Quarter Wave Plate (QWP), wherein the upper TAC protects the Quarter Wave Plate (QWP) from an external force, and the upper TAC is applied by the interface treatment such as the hard coating or the low reflective treatment, to decrease the reflexibility reflected through the polarizer in the high illuminance environment so that the contrast ratio is increased, the light fadedness phenomenon is improved and the outdoor visibility is enhanced.

6. The method of claim 5, wherein the linear-polarizing layer includes a Poly-Vinyl-Alcohol (PVA) layer.

7. The method of claim 6, wherein the circular-polarizing layer includes a Quarter Wave Plate (QWP).

8. The method of claim 7, wherein forming the polarizer includes forming an adhesion layer (PSA) onto a liquid crystal panel, forming a lower TAC on the adhesion layer, forming a PVA on the lower TAC, forming a QWP on the PVA and forming an upper TAC on the QWP.

9. The method of claim 8, wherein the upper TAC includes a low reflective layer.

* * * * *